Dec. 30, 1952   F. A. KRÖGER ET AL   2,623,859
ZINC SULFIDE PHOSPHORS CONTAINING GALLIUM
Filed Aug. 2, 1950
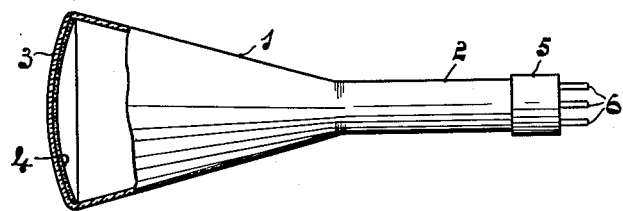
INVENTORS
F.A. KROGER
J.A.M. DIKHOFF
BY
AGENT Patented Dec. 30, 1952

2,623,859

UNITED STATES PATENT OFFICE 2,623,859

ZINC SULFIDE PHOSPHORS CONTAINING GALLIUM

Ferdinand Anne Kröger and Johannes Aloysius Maria Dikhoff, Eindhoven, Netherlands, assignors to Hartford National Bank and Trust Company, Hartford, Conn., as trustee Application August 2, 1950, Serial No. 177,152
In the Netherlands August 8, 1949

3 Claims. (Cl. 252—301.6)

1

The invention relates to electric discharge tubes comprising a luminescent screen.

Some of the materials most frequently in use for luminescent screens are the sulphides, selenides or sulpho-selenides of zinc and cadmium. These substances, when activated are known to produce light upon excitation by electrons, the position of the light in the spectrum varying with the activating substances used, with the ratio between zinc, cadmium, sulphur and selenium and furthermore with the manner of impact. It is common practice to activate these substances, for example, with one or more of the elements copper, silver and gold.

In the production of the aforesaid luminescent substances, use is generally made of a halogenous flux. The use of chlorides, bromides or iodides has limitations in that these halides have two functions, namely:

(a) A crystallising function;
(b) An essential function in the building of the luminescent centres in the crystal lattice.

Fluorides occupy an exceptional position, since they fulfil the function (a) alone. With respect to (a) it should further be noted that this function generally becomes manifest by a reduction of the temperature at which the substance can be produced.

The disadvantage resulting from the use of chlorides, bromides or iodides is that the amounts which are required for the functions (a) and (b) are usually widely different, so that the optimum supply chosen for either of the two functions does not ensure the optimum effect for the other function.

As described in U. S. patent application, Serial No. 136,756, filed January 4, 1950, the aforesaid limitations may be obviated by substituting aluminium for at least part of the halogen.

An electric discharge tube according to the present invention comprises a luminescent substance which is built up from at least one element of each of the following groups:

1. Zinc and cadmium;
2. Sulphur and selenium;
3. Copper, silver and gold;
4. Gallium and scandium.

An electric discharge tube according to the invention consequently comprises a luminescent substance built up from at least one element of the sub-group of group 2 of the periodic table of elements with an atomic number between 29 and 49, at least one element of the sub-group of group 1 of the periodic table of elements, at least one of the elements of the main group of group 6 of the periodic table of elements with an atomic number between 15 and 35 and at least one element of group 3 of the periodic table of elements with an atomic number between 20 and 32.

The total amount of gallium and scandium is preferably comprised between $10^{-4}$ and $10^{-1}$ atoms per 100 atoms of zinc and cadmium.

The other elements of the luminescent substance are available in quantities as hitherto usual for the activated sulphides, selenides or sulpho-selenides of zinc and/or cadmium.

The experiments underlying the invention have shown that gallium and scandium can take over the function (b) of the halogen and when building up a luminescent substance for a discharge tube according to the invention it is therefore free to choose the optimum amount of halide for the function mentioned under (a).

A further advantage incident to the invention is that in certain cases the halide may be dispensed with, since in order to obtain the desired crystallisation condition, the substances may be heated to a high temperature during production.

Absence of halogen has sometimes advantages, for example, if the discharge tube in which the luminescent substance is used comprises component parts which are sensitive to very small amounts of halogen.

The aforesaid advantages incident to the use of gallium and scandium are similar to those of aluminium, as described in the aforesaid prior specification.

However, the use of scandium and/or gallium has a particular advantage, since it has been found that by incorporation of gallium and/or scandium in the aforesaid sulphides it is possible to produce a substance the fluorescence of which is weaker than that of the corresponding compounds without gallium or scandium but the phosphorescence of which is more intense and of longer duration. A substance having such properties is known to be particularly important for electron-ray tubes as used in radar systems.

Incorporation of gallium and/or scandium has the effect of slightly altering the colour of the light emitted by the substances activated by copper, silver or gold. In some cases this circumstance may be of advantage.

In the production of substances for a discharge tube according to the invention, it is possible to utilize chlorine, bromine, iodine or aluminium or several of these elements.

Furthermore the fluorides of aluminium, gallium, scandium, beryllium, magnesium, calcium, strontium, barium, zinc or cadmium may be used.

Some luminescent substances adapted to be used in a discharge tube according to the invention are:

1. Zinc sulphide with copper and gallium, which, in accordance with the copper content, exhibits a yellowish-green to blue fluorescence and a green phosphorescence;
2. Zinc sulphide with gold and scandium, which exhibits a pale yellowish-green fluorescence and a green phosphorescence.

In order that the invention may be readily carried into effect, three examples of the production of various luminescent substances will now be described in detail.

*Example 1*

100 gms. of ZnS is moistened with 100 cc. of an aqueous $Cu(NO_3)_2$ solution, which contains $10^{-3}$ gram-atom of Cu per litre and with 50 cc. of $Sc(NO_3)_3$ solution, which contains $10^{-2}$ gram-atom of Sc per litre. After evaporation to dryness 5 gms. of $CaF_2$ is added and the assembly is adequately mixed and heated for half an hour in a silica crucible at 1150° C. in a $H_2S$-atmosphere. The product obtained exhibits a feeble green fluorescene and an intense green phosphorescence.

*Example 2*

100 gms. of ZnS is moistened with 100 cc. of a $Cu(NO_3)_2$ solution, which contains $10^{-3}$ gram-atom of Cu per litre and with 100 cc. of a solution of $Ga(NO_3)_3$, which contains $10^{-3}$ gram-atom of Ga per litre. After evaporation to dryness, the material is adequately mixed and heated for one hour in a silica crucible at 1200° C. in a $H_2S$-atmosphere. The product obtained exhibits a feeble yellowish-green fluorescence and an intense green phosphorescence.

*Example 3*

100 gms. of ZnS is moistened with 100 cc. of an $AuCl_3$ solution containing $10^{-3}$ gram-mol. of $AuCl_3$ per litre, 100 cc. of a solution, containing $10^{-3}$ gram-mol. of $Al(NO_3)_3$ and 100 cc. of a solution containing $10^{-4}$ gram-mol. of $Ga(NO_3)_3$ per litre. Subsequent to drying at about 100° C. the material is adequately mixed and then heated for half an hour at 1000° C. and subsequently for half an hour at 1200° C. in a $H_2S$-atmosphere. After cooling to 600° C., heating is effected for half an hour in a hydrogen atmosphere. The product obtained exhibits a green fluorescence and an intense green phosphorescence.

In the aforesaid examples of production methods heating is effected in a $H_2S$-atmosphere. However, heating may be performed in a different sulphuring atmosphere, for example, in nitrogen charged with carbon disulphide. As an alternative, the mixture of substances may have sulphur (about 5 gms.) added to it, after which heating is performed in a closed crucible with nitrogen or hydrogen as a protective atmosphere.

The drawing shows a cathode-ray tube of normal design with part of the tube wall broken away.

In this drawing, reference numeral 1 indicates the cone of the cathode-ray tube which further comprises the cylindrical part 2 and the end wall 3 on which on the inside of the tube, a luminescent screen 4 according to the invention is applied. With reference numeral 5 a socket is indicated having contact pins 6.

What we claim is:

1. A luminescent material consisting essentially of a member of the group consisting of sulphides, selenides, and sulpho-selenides of zinc and cadmium and about $10^{-4}$ to $10^{-1}$ atoms of gallium for each 100 atoms of zinc and cadmium for building up centers of luminescene, said member being activated by a metal selected from the group consisting of copper, sliver, and gold.

2. A luminescent material consisting essentially of a member of the group consisting of sulphides, selenides, and sulpho-selenides of zinc and cadmium and about $10^{-4}$ to $10^{-1}$ atoms of gallium for each 100 atoms of zinc and cadmium for building up centers of luminescene, said member being activated by a metal selected from the group consisting of copper, sliver, and gold, and a fluoride flux.

3. A luminescent material consisting essentially of zinc sulfide and about $10^{-4}$ to $10^{-1}$ atoms of gallium for each 100 atoms of zinc for building up centers of luminescene, said sulphide being activated by copper.

FERDINAND ANNE KRÖGER.
JOHANNES ALOYSIUS MARIA DIKHOFF.

REFERENCES CITED

The following references are of record in the file of this patent:

UNITED STATES PATENTS

| Number | Name | Date |
|---|---|---|
| 2,411,155 | Gorn | Nov. 19, 1946 |
| 2,446,248 | Shrader | Aug. 3, 1948 |
| 2,447,322 | Fonda | Aug. 17, 1948 |